(12) United States Patent
Patwardhan et al.

(10) Patent No.: US 12,242,772 B2
(45) Date of Patent: Mar. 4, 2025

(54) MOBILE-ENABLED VOICE SEARCH OF MEDIA ITEMS FOR DISPLAYING ON ALTERNATIVE PLAYBACK DEVICES

(71) Applicant: GOOGLE LLC, Mountain View, CA (US)

(72) Inventors: Jaee Patwardhan, Sunnyvale, CA (US); Sana Mithani, Millbrae, CA (US); Allan Mills, San Francisco, CA (US); Nicolas Klein, San Francisco, CA (US); Yakka Nakia Murphy, San Jose, CA (US); Adam Harrison, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/419,255

(22) PCT Filed: Jul. 1, 2019

(86) PCT No.: PCT/US2019/040201
§ 371 (c)(1),
(2) Date: Jun. 28, 2021

(87) PCT Pub. No.: WO2021/002846
PCT Pub. Date: Jan. 7, 2021

(65) Prior Publication Data
US 2022/0113935 A1    Apr. 14, 2022

(51) Int. Cl.
*G06F 3/16* (2006.01)
*G06F 3/0481* (2022.01)
(Continued)

(52) U.S. Cl.
CPC ............ *G06F 3/167* (2013.01); *G06F 3/0481* (2013.01); *G06F 16/438* (2019.01); *G10L 15/22* (2013.01); *G10L 15/26* (2013.01)

(58) Field of Classification Search
CPC ...... G06F 3/167; G06F 16/438; G06F 3/0481; G10L 15/22; G10L 15/26
See application file for complete search history.

(56) References Cited

U.S. PATENT DOCUMENTS

2012/0019732 A1\* 1/2012 Lee ..................... H04N 21/4622
348/732
2014/0130101 A1    5/2014 Yoshitani et al.
(Continued)

OTHER PUBLICATIONS

PCT International Search Report and Written Opinion for International Application No. PCT/US2019/040201, mailed Jan. 10, 2020, 16 pages.

*Primary Examiner* — William L Bashore
*Assistant Examiner* — Gregory A Distefano
(74) *Attorney, Agent, or Firm* — Lowenstein Sandler LLP

(57) ABSTRACT

A method includes detecting a session between a mobile device and an alternative playback device. In response to detecting that the session has been established, the method also includes presenting a graphical user interface (GUI) on a screen of a mobile device of a user including a voice search GUI element representing a voice search, receiving a user selection of the voice search GUI element, receiving an audio input of the user to request a search of one or more media items, the audio input specifying one or more search criteria for the search, and submitting a textual search query derived from the audio input for processing, wherein a result of the search is to be presented to the user on a screen of the alternative playback device.

18 Claims, 8 Drawing Sheets

(51) Int. Cl.
*G06F 16/438* (2019.01)
*G10L 15/22* (2006.01)
*G10L 15/26* (2006.01)

(56) References Cited

U.S. PATENT DOCUMENTS

| | | | | |
|---|---|---|---|---|
| 2015/0046832 A1* | 2/2015 | George | ................ | G06F 9/4856 |
| | | | | 715/744 |
| 2015/0134322 A1* | 5/2015 | Cuthbert | ................ | G06F 40/58 |
| | | | | 704/3 |
| 2015/0134341 A1* | 5/2015 | Tamura | ............... | G06F 3/04842 |
| | | | | 704/275 |
| 2015/0194050 A1* | 7/2015 | Lee | ........................ | G08C 17/02 |
| | | | | 340/12.22 |
| 2015/0271277 A1* | 9/2015 | Maeda | ................. | H04W 12/06 |
| | | | | 709/203 |
| 2017/0329573 A1* | 11/2017 | Mixter | ............... | H04N 21/4112 |

* cited by examiner

MOBILE-ENABLED VOICE SEARCH OF MEDIA ITEMS FOR DISPLAYING ON ALTERNATIVE PLAYBACK DEVICES

TECHNICAL FIELD

Aspects and implementations of the present disclosure relate to a voice search, and more specifically, to mobile-enabled voice search of media items for displaying on alternative playback devices.

BACKGROUND

Various platforms may provide media content items that are shared by users (e.g., user-uploaded videos, live-streaming videos) and/or provided by various entities (e.g., movies and/or television shows made by production studios). The media content items may include pre-recorded or live-streaming content that is presented to a user on a big screen client device via a user interface of the platforms. The user may access the user interface and use a virtual keyboard to enter a search query for a desired media content item to consume, especially when voice enabled remote control may not be available. Using certain electronic devices to input characters with conventional virtual keyboards may be tedious and entail pressing an inefficient number of key inputs to enter the desired characters.

SUMMARY

The subject matter of the disclosure relates to enabling, on a mobile device, voice search of media items to be displayed on an alternative playback device using an application hosted on the mobile device ("mobile application"). Examples of alternative playback devices include a television (TV) system (e.g., a TV set or a smart TV), a personal computer, a tablet, etc. First, a session between the mobile device and the alternative playback device may be detected. In one implementation, the session may be a casting session. When the session is established, the user may be presented with a graphical user interface (GUI) on a screen of the mobile device. The GUI may include a voice search GUI element to enable the user to perform voice search. Upon a user selection of the voice search GUI element, the user may be prompted (e.g. via on-screen search tips) to provide an audio input requesting a search of one or more media items, the audio input specifying one or more search criteria for the search. When the audio input is received, a textual search query derived from the audio input may be submitted to the alternative playback device to initiate the search and to further present to the user the result of the search on the alternative playback device screen. In other implementations, the textual search query may be submitted to a server (e.g. a search server, a media server) by the mobile device and the result of the search may be displayed on the alternative playback device. The server or the mobile device may transmit the search results to the alternative playback device. When the search results are received and displayed on the alternative playback device screen, the user is further presented with a navigation GUI on the mobile device, with buttons representing "up", "down", "left", "right", and "select", to navigate the search results and to further select an item of the search results to be played on the alternative playback device screen.

By enabling voice search of media items using a microphone of a mobile device, an improved user interface is provided. For example, the user is no longer required to click numerous keys on a virtual keyboard to form a search query. Eliminating the need to type the search query may also reduce the processing resources (on all of a remote control, alternative playback device and backend server) and network bandwidth resources that are incurred during a search. This is achieved because error-free voice search query may result in fewer key presses and fewer media content item suggestion data payloads being sent. Further, because the search query is submitted to the alternative playback device only when the user utters the full search term, processing resources are preserved because the server will no longer receive incomplete search terms as is the case in the conventional solution of typing one character of a search query at a time. Additionally, because the search query is submitted to the backend server by the alternative playback device, the search results presented to the user are optimized to include all relevant media items that are suitable for playing on the screen of the alternative playback device. Alternatively, in some implementations, the search query may be submitted to the backend server by the mobile device directly, and results of the search may be displayed on the screen of the alternative playback device.

According to one aspect of the present disclosure there is provided a method comprising: detecting a session between a mobile device and an alternative playback device; in response to detecting that the session has been established, presenting a graphical user interface (GUI) on a screen of a mobile device of a user, the GUI including a voice search GUI element representing a voice search; receiving a user selection of the voice search GUI element; receiving an audio input of the user to request a search of one or more media items, the audio input specifying one or more search criteria for the search; and submitting a textual search query derived from the audio input for processing, wherein a result of the search is to be presented to the user on a screen of the alternative playback device.

The method may also comprise: wherein the result of the search is not presented to the user on the screen of the mobile device.

Detecting the session between the mobile device and the alternative playback device may further comprise: receiving, via the GUI, a user request to initiate the session between the mobile device and the alternative playback device.

The method may further comprise: wherein submitting the textual search query for processing further comprises: submitting the textual search query to at least one of the alternative playback device or a backend server for processing.

The method may further comprise: wherein the one or more media items are selected from a plurality of media items hosted by a content sharing platform based on the textual search query.

The GUI on the screen of the mobile device may be provided by a first application associated with the content sharing platform.

The result of the search may be presented on the screen of the alternative playback device via a GUI provided by a second application associated with the content sharing platform.

The alternative playback device may be a television system.

The method may further comprise responsive to submitting to the alternative playback device the textual search query, displaying, on the screen of the mobile device, a navigation GUI element to navigate the result of the search on the screen of the alternative playback device.

The method may further comprise displaying, on the GUI, a voice search tip to prompt the user to provide the audio input; and activating an audio input receiving feature of the mobile device to receive the audio input from the user.

Activating the audio input receiving feature of the mobile device may comprise obtaining a user permission to activate the audio input receiving feature of the mobile device.

The session between the mobile device and the alternative playback device may be a casting session, mirroring session, screen sharing session, etc.

The method may also comprise: responsive to failing to receive the audio input of the user to request the search: deactivating an audio input receiving feature of the mobile device; displaying, on the GUI, a tip to prompt the user to make a selection of the voice search GUI element; and responsive to receiving the selection of the voice search GUI element, activating the audio input receiving feature of the mobile device to receive the audio input from the user.

The textual search query may be received by the alternative playback device, and the textual search query is submitted to the content sharing platform by the alternative playback device.

The result of the search query may be selected by the content sharing platform based on a device type of the alternative playback device, and the result of the search query is transmitted, by the content sharing platform, to the alternative playback device for display. For example, the content sharing platform may determine the device type of the alternative playback device. The content sharing platform may do this in any suitable way. For example, the content sharing platform may determine device type based on information contained in a user account associated with the alternative playback device. Alternatively, data may be transmitted from the alternative playback device to the content sharing platform which identifies a device type. Determining the device type allows the content sharing platform to only provide results which are optimized and/or only capable of being processed by the device type.

According to another aspect of the present disclosure there is provided a system comprising one or more apparatus, the one or more apparatus configured to carry out the method described herein above. The system may comprise a client device and an alternative playback device. The system may also comprise a content sharing platform. The client device may be a mobile device, such as a smart phone. The alternative playback device may be a TV. The content sharing platform may comprise a server.

According to another aspect of the present disclosure there is provided a non-transitory computer-readable medium to store instructions, which when executed by one or more processing devices, cause the one or more processing devices to carry out method described herein above.

According to another aspect of the present disclosure there is provided a non-transitory computer-readable medium to store instructions, which when executed by one or more processing devices, cause the one or more processing devices to receive, from an alternative playback device, an indication of a user request to perform a voice search on the mobile device, the one or more processing devices are further to present a voice search GUI element on a GUI presented on a screen of the mobile device, the voice search GUI element representing the voice search, responsive to receiving confirmation to perform the voice search, prompt the user to provide an audio input, receive the audio input of the user to request a search of one or more media items, the audio input specifying one or more search criteria for the search, and submit a textual search query derived from the audio input to the alternative playback device to initiate the search, wherein a result of the search is to be presented to the user on a screen of the alternative playback device.

To prompt the user to provide an audio input, the one or more processing devices may further display, on the GUI, a voice search tip to prompt the user to provide the audio input; and responsive to an activation of the voice search GUI element, enabling the mobile device to receive the audio input from the user.

To present a voice search GUI element on the screen of the mobile device, the one or more processing devices may further initiate a session between the mobile device and the alternative playback device.

The session between the mobile device and the alternative playback device may be a casting session.

The result of the search may not be presented to the user on the screen of the mobile device.

The one or more media items may be selected from a plurality of media items hosted by a content sharing platform based on the textual search query.

The GUI on the screen of the mobile device may be provided by a first application associated with the content sharing platform, and the result of the search is presented on the screen of the alternative playback device via a GUI provided by a second application associated with the content sharing platform.

The alternative playback device may be a television system.

The one or more processing devices may further be to: responsive to submitting to the alternative playback device the textual search query, display, on the screen of the mobile device, a navigation GUI element to navigate the result of the search on the screen of the alternative playback device.

Optional features of each aspects may be combined with other aspects where appropriate.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
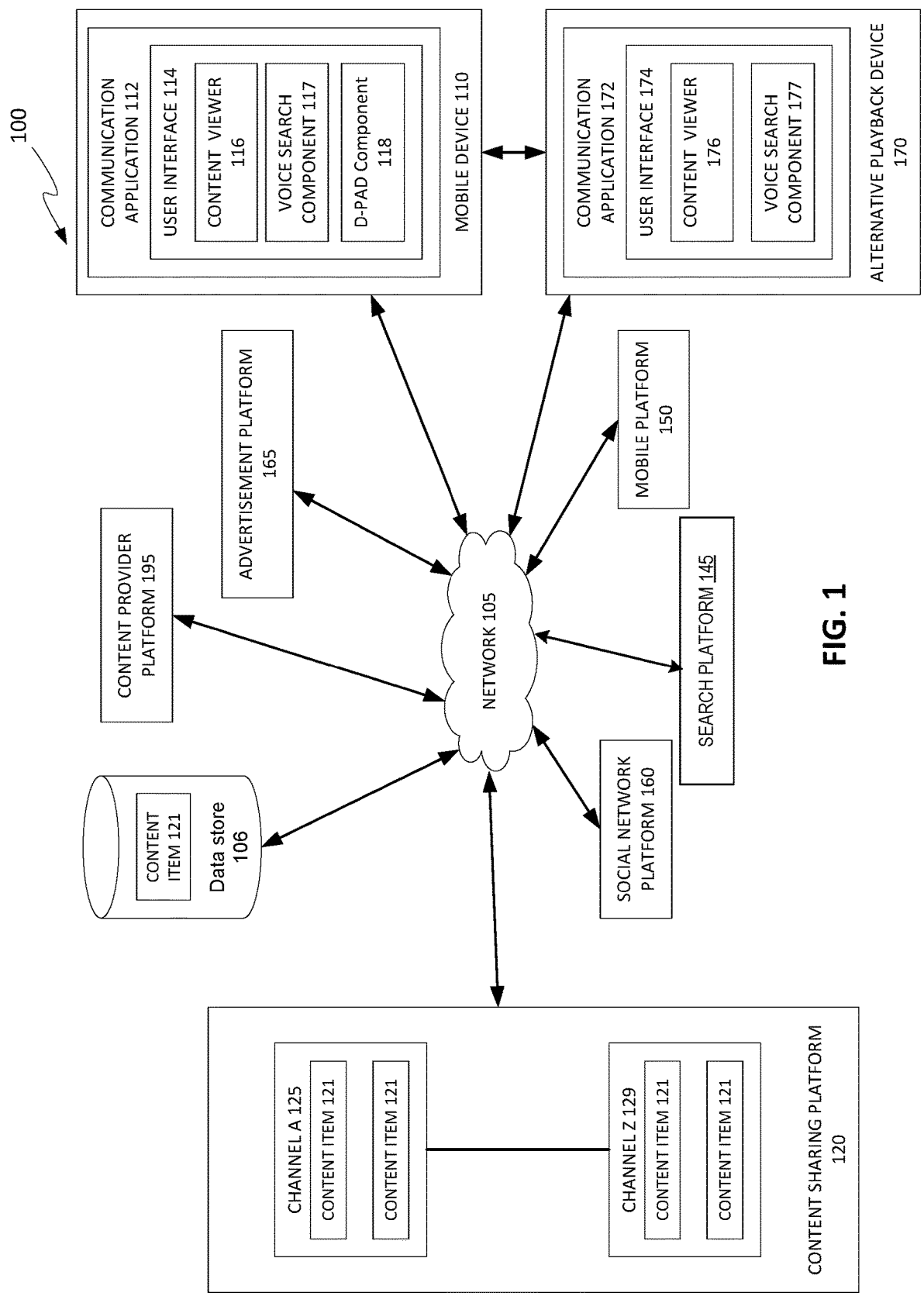
FIG. 1 illustrates an example system architecture for mobile-enabled voice search for media content items, in accordance with one implementation of the disclosure.

A technical problem addressed by embodiments of the disclosure is that unnecessary processing resources as well as a poor user experience may occur when typing characters on a search user interface on a playback device such as a television (TV) system when searching for media content items to be played on the TV. For example, when a user is watching a media item on a TV with a remote control that does not support voice search, the user may need to type a search query to find a particular media item to consume. Typing a search query often includes numerous key-presses to navigate a virtual keyboard displayed on the TV screen and to select characters using a directional pad. The multiple key presses can undesirably consume processing resources on both a remote control (if used) and a TV (which displays the virtual keyboard). Additionally, this is particularly problematic due to the undesirable user experience of having to click potentially tens of keys to form a search query in order to find a certain media item that the user is interested to play.

Further, each time a character is entered by a user using the virtual keyboard, the character is transmitted from the TV to a server to look-up media content items based on the entered character. The server may transmit information pertaining to the found media content items that include the entered character in their titles as suggestions to the TV that is displaying the search user interface. The information pertaining to the found media content items may include, for example, a thumbnail, the full video file of the media content item, metadata (e.g., title and description of the media content item), etc. Sending multiple data payloads with the above information as the user enters the search query can consume processing resources at the server to perform the look-up operations, processing resources at the TV by displaying the list of suggested media content items, network bandwidth resources by sending multiple data payloads as the characters are entered, and the like.

Another technical problem addressed by embodiments of the disclosure is that entering a search query in a conventional manner by moving a cursor across multiple rows and columns of a virtual keyboard to find the desired characters can be error-prone for a user, resulting in a diminished user experience. The user has to track the cursor around the virtual keyboard and stop it on the desired character to select that character. If a title includes lots of characters, the more key-presses required to enter the title, the higher the chance of selecting a wrong character on accident, thus requiring the user to delete the erroneous character and re-enter the correct one. This lengthy and error-prone procedure of searching for media items to be played on the TV results in an undesirable and inconvenient experience for the user watching the TV who expects to be able to quickly and efficiently find the media items that they are looking for.

Yet another technical problem addressed by embodiments of the disclosure relates to the use of a mobile device (instead of a remote controller and the virtual keyboard on the TV screen) to perform the search of media items and display the search result on the mobile device for the user to make a selection to be played on the TV. Having to navigate potentially numerous media items in the search result on a small screen of a mobile device instead of utilizing the large TV screen for navigating and selecting a media item to consume may not provide a desirable experience for users. An ideal user experience is achieved when a user consuming media items on a TV is required to do as little interactions with a mobile device as possible. More importantly, when the mobile device submits the search query to a backend server to render search results, the backend server may customize the search result to include media items suitable for consumption on the mobile device, thus potentially leaving out media items that are suitable for consumption on a TV, which is where the user intends to consume the media item he or she is seeking.

A technical solution to one or more of the above identified technical problems may include using the microphone of a mobile device to perform a voice search of media items hosted by a content sharing platform while providing search results that include media items suitable for consumption on the TV and displaying these search results on the TV. First, a user may request to initiate a casting session between the mobile device and the TV via a graphical user interface (GUI) presented on a screen of the mobile device. Alternatively, in some implementations, a casting session may have already been established between the mobile device and the TV. A casting session refers to a communication mechanism to provide for media item sharing between devices for display, where one device sends a media item to another device via a wireless connection. When the casting session is initiated, the user may be presented with a voice search GUI element to enable the user to perform voice search. Upon a user selection of the voice search GUI element, the user may be prompted (e.g. via on-screen search tips) to provide an audio input requesting a search of one or more media items, where the audio input may specify one or more search criteria for the search. When the audio input is received, a textual search query derived from the audio input may be submitted to the TV to initiate the search and to further present to the user the result of the search on the TV screen. Alternatively, in some implementations, the search query may be submitted to a server (e.g. a search server, a media server) by the mobile device directly, and results of the search may be received and displayed on the TV screen. When the search results are displayed on the TV, the user is further presented with a navigation GUI on the mobile device, with buttons representing "up", "down", "left", "right", and "select", to navigate the search results and to further select an item of the search results to be played on the TV. In this way, improved control of the user interface is provided.

By enabling voice search of media items using a microphone of a mobile device, the user is no longer required to click numerous keys on a virtual keyboard to form a search query. Further, because the search query is submitted to the TV only when the user utters the full search term, processing resources are preserved because the server will no longer receive incomplete search terms as is the case in the conventional solution of typing one character of a search query at a time. Additionally, because the search query is submitted to the backend server by the TV, the search results presented to the user are optimized to include all relevant media items that are suitable for playing on a TV screen.

Thus, the technical effect may include improving the user experience by eliminating the need for numerous key presses to enter a search query to find a media content item by replacing the typed search query with a voice search. For example, the user may provide one or two key presses to initiate a casting session between the TV and the mobile device, and to activate the voice search feature on the mobile device. Once the user provides an audio input via the microphone of the mobile device, a textual search query derived from the audio input is submitted to the TV without the need for the user to provide any further key presses. Eliminating the need to type the search query may also reduce the processing resources (on all of a remote control, TV and backend server) and network bandwidth resources that are incurred during a search. This is achieved because of fewer key presses and fewer media content item suggestion data payloads being sent if a desired media content item is found based on error-free voice search query.

FIG. 1 illustrates an example system architecture 100 for providing a voice search capability for efficient use during media content item searching, in accordance with one implementation of the disclosure. The system architecture 100 includes one or more client devices (e.g. mobile device 110 and alternative playback devices 170), one or more networks 105, one or more data stores 106, and one or more platforms (e.g., content sharing platform 120, advertisement platform 165, mobile platform 150, social network platform 160, search platform 145, and content provider platform 195). The platforms can be one or more computing devices (such as a rackmount server, a router computer, a server computer, a personal computer, a mainframe computer, a laptop computer, a tablet computer, a desktop computer, etc.), data stores (e.g., hard disks, memories, and databases), networks, software components, and/or hardware components.

The one or more networks 105 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 100 are not directly connected to each other. In one implementation, architecture 100 includes separate networks 105.

The one or more data stores 106 can be memory (e.g., random access memory), cache, drives (e.g., hard drive), flash drives, database systems, or another type of component or device capable of storing data. The one or more data stores 106 can include multiple storage components (e.g., multiple drives or multiple databases) that may also span multiple computing devices (e.g., multiple server computers). The data stores 106 can be persistent storage that are capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Content items 121 (media content items) can be stored in one or more data stores 106. The data stores 106 can be part of one or more platforms. Examples of a content item 121 can include, and are not limited to, digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. Content item 121 is also referred to as a media item. The content items 121 may be pre-recorded or live-streaming. For brevity and simplicity, media item is used as an example of a content item 121 throughout this document.

The content items 121 can be provided by content providers. A content provider can be a user, a company, an organization, etc. A content provider can provide content items 121 that are video advertisements. A content provider that provides video advertisements is hereinafter referred to as an advertiser. For example, a content item 121 may be a video advertisement for a car provided by a car advertiser. A service provider can charge an advertiser a fee, for example, when the service provider provides the advertisements on client devices 110 and 170 to be viewed by users.

The mobile device 110 can include devices, such as, smart phones, cellular telephones, personal digital assistants (PDAs), tablet computers, portable media players, and the like.

The alternative playback device 170 can include devices, such as, television set, smart television, netbooks, laptop computers, electronic book readers, tablet computers, desktop computers, and the like.

The mobile device 110 can include a communication application 112. A content item 121 can be consumed via the communication application 112, the Internet, etc. As used herein, "media," "media item," "online media item," "digital media," "digital media item," "content," "media content item," and "content item" can include an electronic file that can be executed or loaded using software, firmware or hardware configured to present a content item. In one implementation, the communication applications 112 may be applications that allow users to compose, send, and receive content items 121 (e.g., videos) over a platform (e.g., content sharing platform 120, advertisement platform 165, mobile platform 150, social network platform 160, search platform 145, and content provider platform 195) and/or a combination of platforms and/or networks.

For example, the communication application 112 may be a social networking application, video sharing application, video streaming application, video on demand application, photo sharing application, chat application, mobile application of a content provider or any combination of such applications. The communication application 112 in a mobile device can render, display, and/or present one or more content items 121 (e.g., videos) to one or more users. For example, the communication application 112 can provide one or more user interfaces (e.g., graphical user interfaces) to be rendered in a display of a client device for sending, receiving and/or playing videos. The communication application 112 in a mobile device can also receive audio input via an audio receiving device (e.g. a microphone).

In one implementation, the communication application 112 may include a voice search component 117 and a content viewer 116 and may provide a user interface 114 that may be used to enable voice search by receiving an audio input representing one or more search criteria requesting a search of one or more content items 121. The audio input is received via a voice search GUI element presented in a content viewer 116 portion of the user interface 114. In one implementation, the content viewer 116 is embedded in an application (e.g., communication application 112). In another implementation, the content viewer 116 may be a standalone application (e.g., mobile application), such as communication application 112, that allows users to consume (e.g., play, display) content items 121, such as videos, images, documents (e.g., web pages), etc. For example, the content viewer 116 may be a web browser that can access, retrieve, present, and/or navigate content (e.g., web pages such as Hyper Text Markup Language (HTML) pages, digital media items, etc.) served by a web server of a platform. In another example, the content viewer 116 may display an embedded media player (e.g., a Flash® player or an HTML5 player) that is embedded in a document (e.g., user interface 114 (a web page)).

The content viewer 116 can be provided to the mobile device 110 by a server and/or a platform. For example, the content viewers 116 may be embedded media players that are embedded in user interfaces 114 (e.g., documents (web pages) or screens of a stand-alone application) provided by the content sharing platform 120 or the content provider platform 195. In another example, the content viewers 116 may be applications that are downloaded from a platform (e.g., content sharing platform 120, advertisement platform 165, mobile platform 150, social network platform 160, search platform 145, and content provider platform 195). In another example, the content viewers 116 may be standalone applications that are pre-installed on the mobile device 110.

The voice search component 117 may provide a voice search capability by receiving an audio input representing one or more search criteria requesting a search of one or more media items, and submitting a textual search query that is derived from the audio input to the alternative playback device 170 to initiate the search. The voice search component 117 may be implemented in computer instructions that are stored on one or more memory devices and that are executed by one or more processing devices. The voice search component 117 may receive, via user interface 114, a user request to initiate a casting session between the mobile device 110 and the alternative playback device 170. When the casting session is initiated, the user interface 114 may present a GUI including a voice search GUI element representing a voice search (e.g. an icon of a microphone). A user may select the voice search GUI element to start a voice search by providing an audio input to the user interface 114 of the communication application 112 (e.g. via a microphone of the mobile device 110). The audio input can represent one or more search criteria requesting a search of one or more content items 121 hosted by the content sharing platform 120. A textual search query that is derived from the audio input can be submitted to the alternative playback device 170 to initiate the search.

In another implementation, the communication application 112 may include a D-Pad component 118 representing a virtual directional pad that includes keys corresponding to up, down, left, right, and enter (select) to navigate the media items in the search results displayed on the alternative playback device 170. The D-Pad component 118 may receive key input selections when the user presses one or more of the virtual keys on the directional pad. The D-Pad component 118 may transmit the key inputs to the alternative playback device 170 for processing by one or more processors running the voice search component 177.

The alternative playback device 170 can include a communication application 172. A content item 121 can be consumed via the communication application 172, the Internet, etc. As used herein, "media," "media item," "online media item," "digital media," "digital media item," "content," "media content item," and "content item" can include an electronic file that can be executed or loaded using software, firmware or hardware configured to present a content item. In one implementation, the communication applications 172 may be applications that allow users to compose, send, and receive content items 121 (e.g., videos) over a platform (e.g., content sharing platform 120, advertisement platform 165, mobile platform 150, social network platform 160, search platform 145, and content provider platform 195) and/or a combination of platforms and/or networks.

For example, the communication application 172 may be a social networking application, video sharing application, video streaming application, video on demand application, photo sharing application, chat application, mobile application of a content provider or any combination of such applications. The communication application 172 in an alternative playback device 170 can render, display, and/or present one or more content items 121 (e.g., videos) to one or more users. For example, the communication application 172 can provide one or more user interfaces (e.g., graphical user interfaces) to be rendered in a display of an alternative playback device for sending, receiving and/or playing videos.

In one implementation, the communication application 172 may include a voice search component 177 and a content viewer 176 and may provide a user interface 174 that may be used to display, in the content viewer 176 portion, a result of media item search, comprising one or more content items 121. The user interface 174 that may also be used to display a voice search GUI element to initiate, on the mobile device 110, a voice search of media content items 121. The content viewer 176 may render, display, and/or present content items 121 (e.g., videos) to one or more users. In one implementation, the content viewer 176 is embedded in an application (e.g., communication application 172). In another implementation, the content viewer 176 may be a standalone application (e.g., desktop application, television application, etc.), such as communication application 172, that allows users to consume (e.g., play, display) content items 121, such as videos, images, documents (e.g., web pages), etc. For example, the content viewer 176 may be a web browser that can access, retrieve, present, and/or navigate content (e.g., web pages such as Hyper Text Markup Language (HTML) pages, digital media items, etc.) served by a web server of a platform. In another example, the content viewer 176 may display an embedded media player (e.g., a Flash® player or an HTML5 player) that is embedded in a document (e.g., user interface 174 (a web page)).

The content viewer 176 can be provided to the alternative playback device 170 by a server and/or a platform. For example, the content viewers 176 may be embedded media players that are embedded in user interfaces 174 (e.g., documents (web pages) or screens of a stand-alone application) provided by the content sharing platform 120 or the content provider platform 195. In another example, the content viewers 176 may be applications that are downloaded from a platform (e.g., content sharing platform 120, advertisement platform 165, mobile platform 150, social network platform 160, search platform 145, and content provider platform 195). In another example, the content viewers 176 may be standalone applications that are pre-installed on the alternative playback device 170.

The voice search component 177 may provide a voice search GUI element to initiate a voice search of media content items on the mobile device 110 and then display the result of the search of media items in the content viewer 176 portion of the user interface 174. In some implementations, voice search component 177 may provide the voice search capability to allow for quick and efficient search of media items without having to type a search query using a virtual keyboard displayed on the screen of the alternative playback device 170. The voice search component 177 may be implemented in computer instructions that are stored on one or more memory devices and that are executed by one or more processing devices. The voice search component 177 may receive, via a voice search GUI element presented on user interface 174, a user request to initiate a voice search of media items using the communication application 112 on the mobile device 110. The voice search component 177 may prompt the user to launch an application on the mobile device 110 to perform a voice search (e.g. using the microphone of the mobile device 110). In this implementation, to enable the voice search on the mobile device 110, the voice search component 177 may implicitly initiate a casting session may be between the alternative playback device 170 and the mobile device 110, for example, when the communication application 112 is launched on the mobile device 110.

The voice search component 177 may receive, from the mobile device 110, a textual search query derived from an audio input specifying one or more search criteria requesting a search of one or more content items 121 hosted by the content sharing platform 120. The voice search component 177 may then submit the textual search query to the content sharing platform 120 to perform the search and to send the search results to the alternative playback device 170 for display to the user. In some implementations, the content sharing platform 120 may select the media items to be included in the search result based on the device type of the client device requesting the search result, in this case the alternative playback device 170 is requesting the search results. For example, a media item that is more suitable for playing on a mobile device (e.g. a hyperlink to a web page) may not be included in search result being sent to a television. Similarly, a media item that is more suitable for playing on a television (e.g. a live program on a television network) may not be included in search result being sent to a mobile device.

The result of the search may be presented to the user in the content viewer 176 of the alternative playback device 170, and not on the screen of the mobile device 110. The user may navigate the result of the search displayed on the alternative playback device 170 via the D-Pad component 118 of the mobile device 110. The user may also select one of the media items in the result of the search to be played in the content viewer 176 of the alternative playback device 170.

The content provider platform 195 can provide a service and the content provider can be the service provider. For example, a content provider may be a video streaming service provider that provides a media streaming service via a communication application 172 for users to play videos, TV shows, video clips, audio, audio clips, and movies, on alternative playback devices 170 via the content provider platform 195.

The social network platform 160 can provide an online social networking service. The social network platform 160 can provide a communication application 112 for users to create profiles and perform activity with their profile. Activity can include updating a profiling, exchanging messages with other users, posting status updates, photos, videos, etc. to share with other users, evaluating (e.g., like, comment, share, recommend) status updates, photos, videos, etc., and receiving notifications of other users activity.

The mobile platform 150 can be and/or include one or more computing devices (e.g., servers), data stores, networks (e.g., phone network, cellular network, local area network, the Internet, and/or a combination of networks), software components, and/or hardware components that can be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephony communication, Short Message Service (SMS) messaging, Multimedia Message Service (MMS) messaging, text chat, and/or any other communication between users. The mobile platform 150 can support user communications via video messaging, video chat, and/or videoconferences.

The search platform 145 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to allow users to query the one or more data stores 106 and/or one or more platforms and receive query results.

The advertisement platform 165 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used provide video advertisements.

The content sharing platform 120 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide one or more users with access to content items 121 and/or provide the content items 121 to one or more users. For example, the content sharing platform 120 may allow users to consume, upload, download, and/or search for content items 121. In another example, the content sharing platform 120 may allow users to evaluate content items 121, such as, approve of ("like"), dislike, recommend, share, rate, and/or comment on content items 121. In another example, the content sharing platform 120 may allow users to edit content items 121. The content sharing platform 120 can also include a web site (e.g., one or more web pages) and/or one or more applications (e.g., communication applications 115) that may be used to provide one or more users with access to the content items 121, for example, via mobile devices 110 and alternative playback devices 170. Content sharing platform 120 can include any type of content delivery network providing access to content items 121.

The content sharing platform 120 can include multiple channels (e.g., Channel A 125 through Channel Z 129). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 125 may include videos Y and Z. A channel can be associated with an owner, who is a user that can perform actions on the channel. The data content can be one or more content items 121. The data content in the channels can be pre-recorded or live-streaming. Although channels are described as one implementation of a content sharing platform, implementations of the disclosure are not limited to content sharing platforms that provide content items 121 via a channel model.

Figure 2:
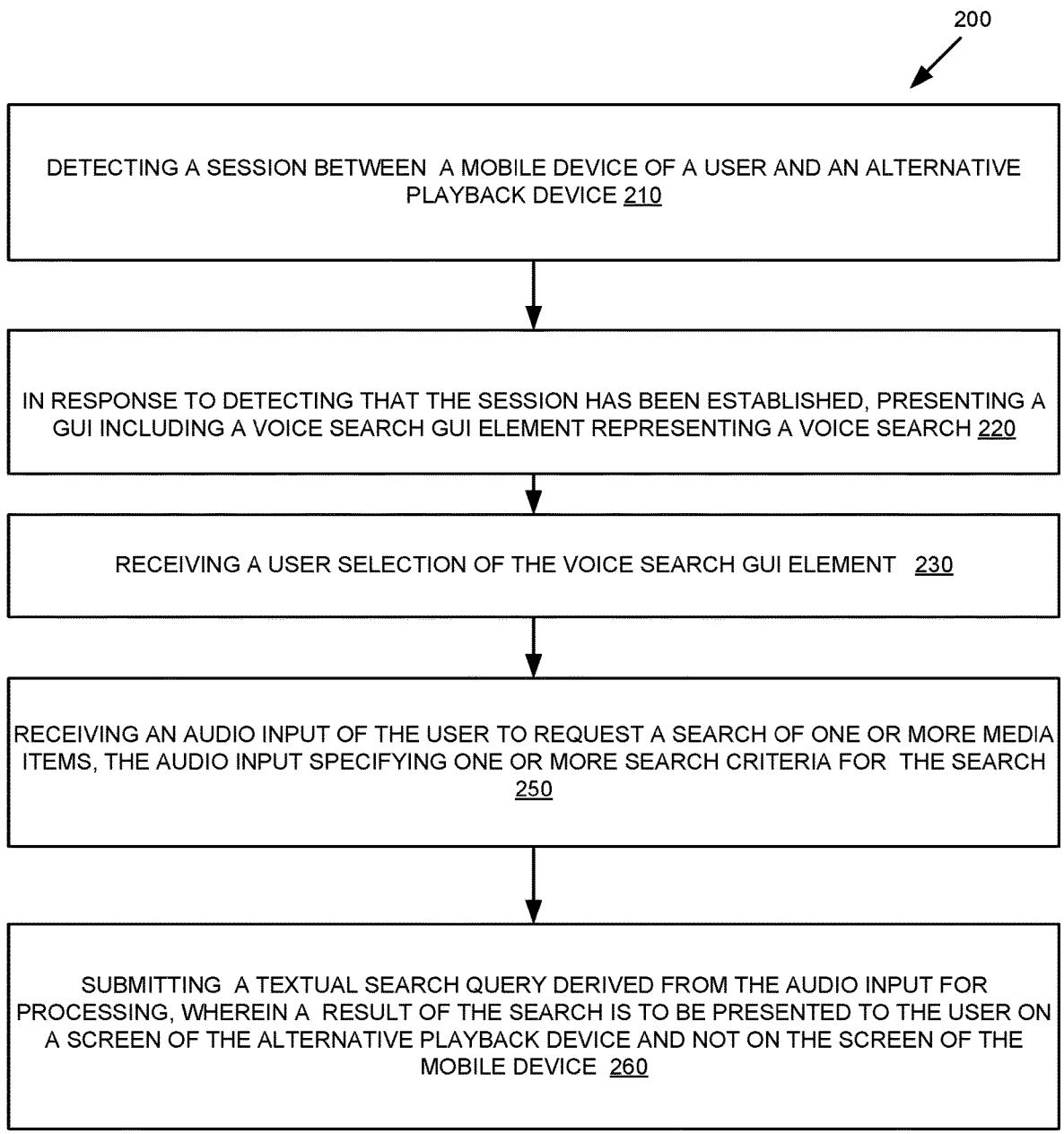
FIG. 2 depicts a flow diagram of aspects of a method for performing voice search for media content items, in accordance with one implementation of the present disclosure.

FIG. 2 depicts a flow diagram of aspects of a method 200 for performing voice search for media content items, in accordance with one implementation of the present disclosure. The method 200 is performed by processing device that may comprise hardware (circuitry, dedicated logic, etc.), software (such as is run on a general purpose computer system or a dedicated machine), or a combination of both. In one implementation, the method 200 is performed by a voice search component 117 in a mobile device 110 of FIG. 1. In one implementation, a processing device of a mobile device performs method 200.

At block 210, the processing device may detect the existence of a session between a mobile device and an alternative playback device, so that the mobile device may communicate with the alternative playback device by sending, via the session, media items to be played on a screen of the alternative playback device. In one implementation, detecting a session may involve receiving a user request to initiate a session between a mobile device and an alternative playback device. In some implementations, the alternative playback device may be a television (TV) system or other client devices having a large screen, as compared to a mobile device having a small screen. In certain implementations, the user request to initiate the session may be received via a graphical user interface (GUI) on a screen of the mobile device. The GUI on the screen of the mobile device may be provided by a first application associated with a content sharing platform (e.g. content sharing platform 120 of FIG. 1). Further, in one implementation, the session between the mobile device and the alternative playback device may be a casting session. Casting session may provide for media item sharing between devices for display, where one device sends a media item to another device via a wireless connection. In one implementation, the mobile device may initiate a casting session with the alternative playback device to send a textual search query to the alternative playback device so that a search of media items pursuant to the search query may be initiated by the alternative playback device.

At block 220, in response to detecting that the casting session has been initiated between the mobile device and the TV, the processing device may present a GUI including a voice search GUI element representing a voice search (e.g. a button with a microphone image). Upon successful initiation of the casting session, a notification may be displayed on the screen of the mobile device indicating that the casting session is initiated and that media items can be casted (e.g. for display, play, or otherwise consume) to the TV (e.g. "Ready to cast to TV"). Similarly, a notification may be displayed on the TV screen indicating that a casting session with the mobile device has been initiated (e.g. "Successfully linked to mobile device"). In one implementation, the processing device may display, on the GUI of the mobile device, a voice search tip to prompt the user to provide an audio input. For example, the search tip may be "search on TV with voice".

At block 230, the processing device may receive a user selection of the voice search GUI element. When the user selects the voice search GUI element, for example by clicking on voice search GUI element, the processing device may activate an audio input receiving feature of the mobile device to receive audio input from the user. For example, the audio input receiving feature may be a microphone of the mobile device. Further, the processing device may obtain a user permission in order to activate the audio input receiving feature of the mobile device. For example, a user may be prompted to give permission to the processing device to access the microphone of the mobile device, with options to either allow or deny the access. If the user selects to allow access to the microphone, the processing device may activate the microphone of the mobile device and an audio input form the user specifying the search query may be recorded. On the other hand, if the user selects to deny access to the microphone, the voice search function may be aborted. In one implementation, the user may be prompted to give permission for microphone access the first time the voice search capability is launched on the mobile device.

After activating the microphone, the microphone may be listening for an audio input from the user. The user may be prompted to speak the search term for finding the media items they want to consume. For example, a search tip may be presented on the screen of the mobile device stating "Try saying, 'Play some music'".

At block 250, the processing device may receive the audio input of the user to request a search of the media items the user wants to consume. The audio input may specify search criteria for the media item search. In some implementations, media items may be selected from a plurality of media items hosted by a content sharing platform (e.g. content sharing platform 120 of FIG. 1), and the selection may be based on the search criteria provided by the user.

At block 260, the processing device may obtain a textual search query derived from the audio input (e.g. via a search platform 145 of FIG. 1). The processing logic may then submit the textual search query for processing of the textual search query. In some implementations, the processing logic may submit the textual search query to the alternative playback device via the casting session. The alternative playback device may receive the textual search query and may initiate the search by submitting the textual search query to the content sharing platform to perform the search. The content sharing platform may perform the search and may create a search result by selecting media items that match the textual search query and including the selected media items in the search result. In one implementation, the content sharing platform may select the media items based on the device type of the alternative playback device. For example, a media item that is more suitable for playing on a mobile device (e.g. a hyperlink to a webpage) may not be included in search result being sent to a television. The content sharing platform may then transmit the search result to the alternative playback device to be presented to the user on a screen of the alternative playback device. In one example, the search results may be presented on the screen of the alternative playback device via a GUI provided by an application (e.g. a television application) associated with the content sharing platform. In certain implementations, the search results may not be transmitted to the mobile device for display.

The processing device may display a navigation GUI element on the screen of the mobile device, to navigate media items within the search result displayed on the screen of the alternative playback device, and to select a media item for playing on the screen of the alternative playback device. In some implementations, the navigation GUI element may represent a virtual directional pad that includes keys corresponding to up, down, left, right, and enter (select). The navigation GUI element may receive key input selections when the user presses one or more of the virtual keys on the directional pad. The processing device may then transmit the key inputs to the alternative playback device for processing.

Figure 3:
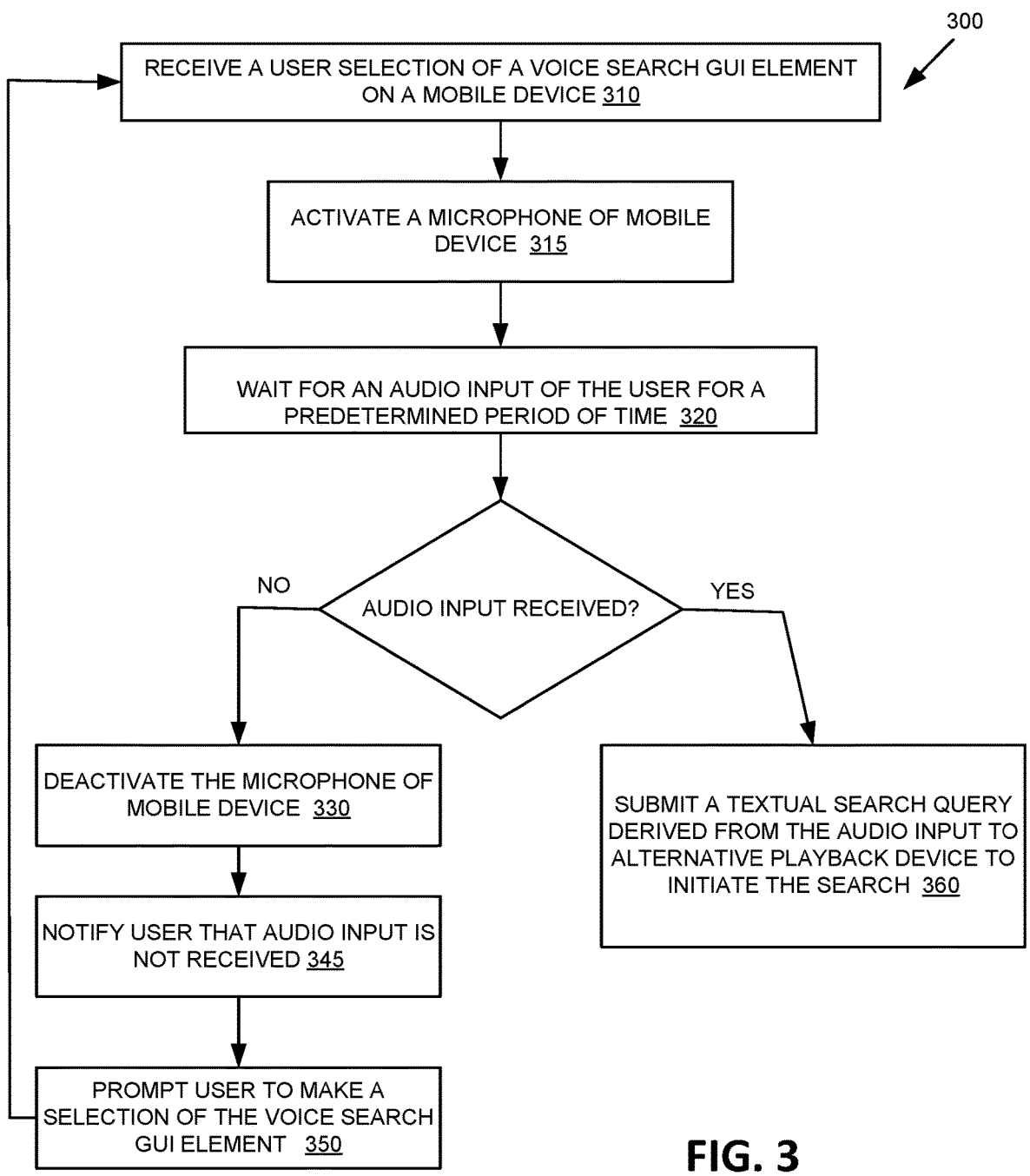
FIG. 3 depicts a flow diagram of aspects of a method for performing voice search for media content items when attempts to receive audio input fail, in accordance with one implementation of the present disclosure

FIG. 3 depicts a flow diagram of aspects of a method 300 for performing voice search for media content items when attempts to receive audio input fail, in accordance with one implementation of the present disclosure. The method 300 is performed by processing device that may comprise hardware (circuitry, dedicated logic, etc.), software (such as is run on a general purpose computer system or a dedicated machine), or a combination of both. In one implementation, the method 230 is performed by a voice search component 117 in a mobile device 110 of FIG. 1. In one implementation, a processing device of a mobile device performs method 300.

At block 310, the processing device may receive a user selection of a voice search GUI element on a screen of a mobile device, for example via user clicking on the voice search GUI element. The processing device may activate a microphone of the mobile device, at block 315, to receive audio input from the user, as explained in more details herein above. The user may be prompted to say the search term to find the media item the user is looking for.

At block 320, the processing device may wait for a predetermined period of time to receive an audio input form the user. In one example, the wait time may be set to twenty seconds. The active microphone may receive the spoken phrase representing the audio input specifying the search criteria from the user and may submit the audio input to the processing device for processing. If the audio input is received during the wait time period, the processing device may obtain a textual search query derived from the audio input (e.g. via a search platform 145 of FIG. 1). The processing logic may then submit the textual search query to the alternative playback device via the casting session to initiate the search at block 360.

If, on the other hand, the audio input is not received within the wait time period, the processing device may deactivate the microphone of the mobile device at block 330. The microphone may fail to receive an audio input from the user for any number of reasons including, for example, that the user did not say anything during the waiting time period, or that a high level of noise prevented the microphone from capturing an audio input from the user. After deactivating the microphone, the processing device at block 345 may notify the user that an audio input was not received and may further prompt the user to try providing the audio input again. For example, a message may be presented on the screen of the mobile device stating "Didn't hear that. Tab the mic to try again".

At block 350, the processing device may prompt the user that in order to try providing the audio input again, the user may need to activate the microphone again by making a selection of the voice search GUI element. Keeping the microphone active for only a short period of time before automatically deactivating the microphone may be desirable to eliminate the accidental recording of speech from the user if the user activates the microphone and later forgets or gets distracted to provide a search criteria of media items. This way, if the user clicks the voice search GUI elements but forgets to provide an audio input, the microphone may stay active only briefly and then will be deactivated, thus preventing the microphone from capturing user speech beyond this point. The user may choose to activate the microphone again if they wish to try again to perform a voice search.

Figure 4:
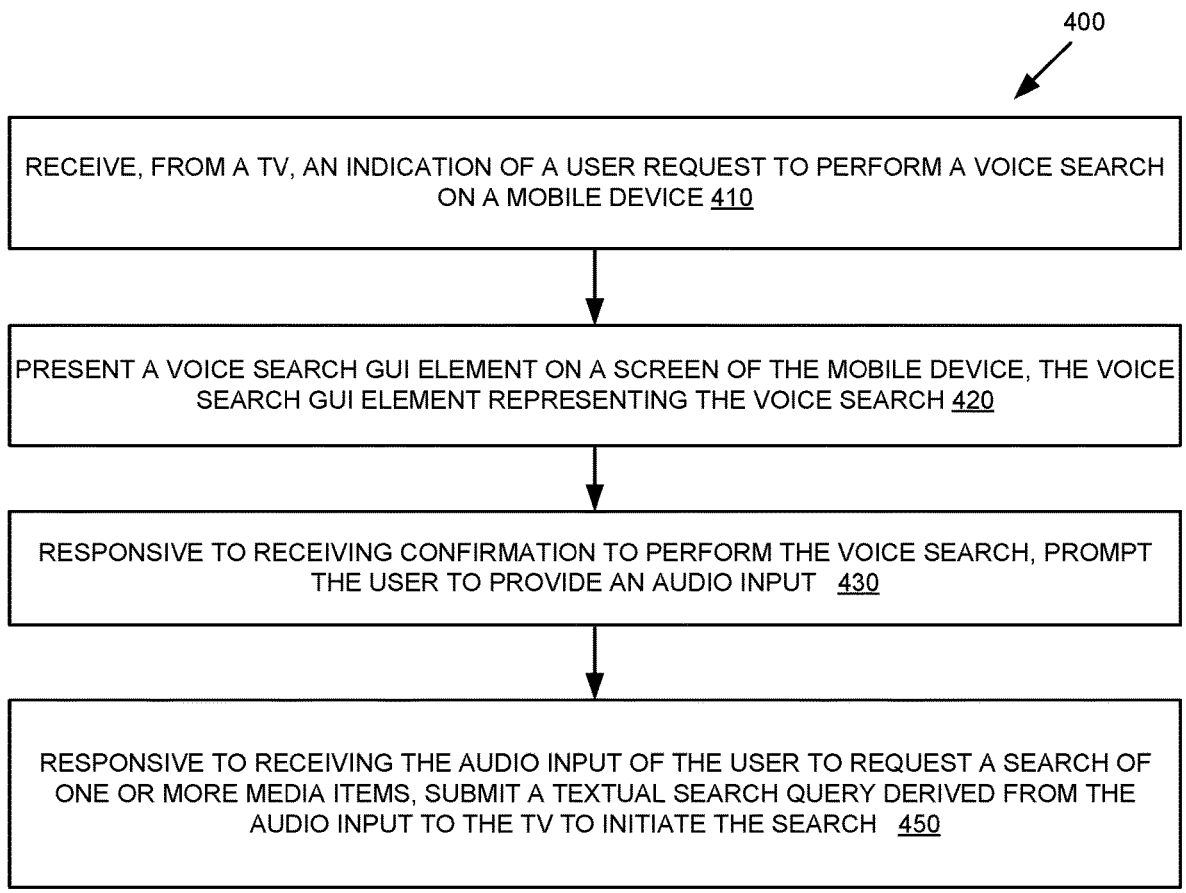
FIG. 4 depicts a flow diagram of aspects of a method for performing voice search for media content items initiated from a GUI element on a TV screen, in accordance with one implementation of the present disclosure

FIG. 4 depicts a flow diagram of aspects of a method 400 for performing voice search for media content items initiated from a GUI element on a TV Screen, in accordance with one implementation of the present disclosure. The method 400 is performed by processing device that may comprise hardware (circuitry, dedicated logic, etc.), software (such as is run on a general purpose computer system or a dedicated machine), or a combination of both. In one implementation, the method 400 is performed by a voice search component 117 in a mobile device 110 of FIG. 1. In one implementation, a processing device of a mobile device performs method 400.

At block 410, the processing device of a mobile device may receive from a TV an indication of a user request to perform a voice search on the mobile device. In certain implementations, the user may be presented with a voice search GUI element on a media search page of a TV application. The media search page may also display a virtual keyboard to enable the user to provide a search term of media items by typing the search term using the virtual keyboard. In one implementation, the user may be presented with a search tip on the TV screen indicating that the user may use voice search from their mobile device instead of typing the search term using the virtual keyboard. For example, the search tip may state "Try voice search. Open the mobile app on your mobile device to search using the microphone." The user may select the voice search GUI element presented on the TV screen (e.g. by clicking on the voice search GUI element). In some implementations, a processing device of the TV application may broadcast the user request to initiate voice search of media items on the mobile device. When the user launches the mobile application on the mobile device, the mobile application may receive the broadcasted message indicating the user's request to initiate a voice search on the mobile device.

At block 420, the mobile application, upon receiving the indication of a user request to initiate the voice search, may present a voice search GUI element on the screen of the mobile device. In this case, the mobile application may further implicitly initiate a casting session between the TV and the mobile device, e.g. when the mobile application launches on the mobile device. The mobile application may then prompt the user to confirm the request to perform voice search using the mobile device. For example, the mobile application may present a message on the mobile screen stating "Search on TV faster with voice", with options to dismiss or allow the voice search function. The user may confirm the voice search request by tabbing the allow button.

At block 430, responsive to receiving confirmation from the user to perform the voice search, the processing device may prompt the user to provide an audio input (e.g. via a search tip indicating the voice search functionality). In certain implementations, the user may need to activate the microphone of the mobile device (e.g. by tabbing a voice search GUI element) to enable the mobile device to receive audio input form the user. The user may then speak the search phrase which may be recorded by the microphone as an audio input and the processing device may receive the audio input recorded by the microphone.

At block 450, responsive to receiving the audio input form the user representing search criteria for one or more media items, the processing device may obtain a textual search query derived from the audio input. The processing device may then submit the textual search query to the TV via the casting session, as explained in more details herein above. The result of the search may be presented to the user on the TV screen and not on the mobile device screen.

Figure 5:
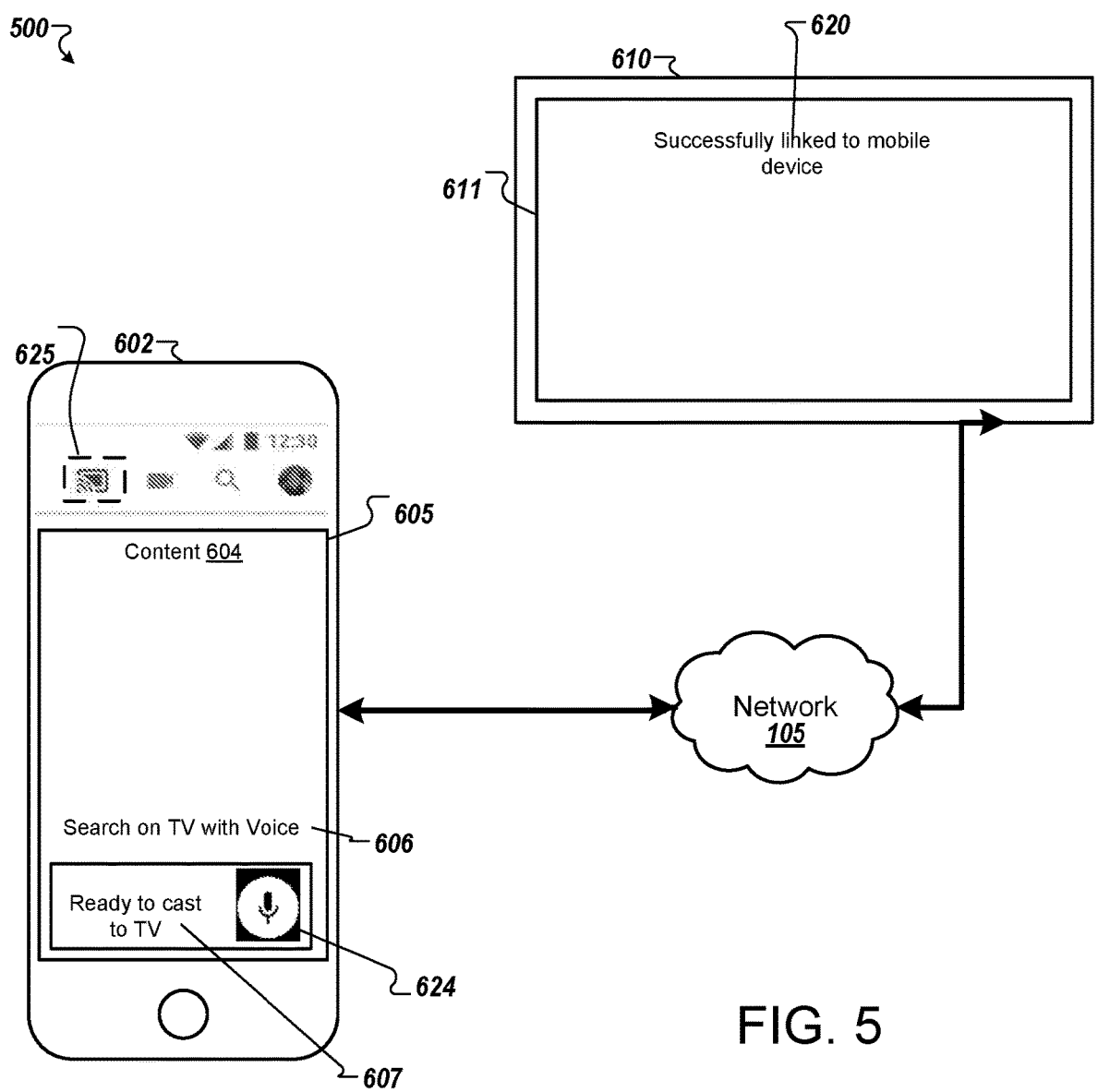
FIG. 5 illustrates an example system that includes a mobile device initiating a casting session with an alternative playback, in accordance with some embodiments of the disclosure.

FIG. 5 illustrates an example system 500 that includes a mobile device 602 with a first GUI 605 to initiate a casting session with an alternative playback device 610, in accordance with some embodiments of the disclosure. The mobile device 602 may be a mobile device 110, as described in conjunction with FIG. 1. The alternative playback device 610 may be the alternative playback device 170 as described in conjunction with FIG. 1. In some embodiments, the first UI 605 is presented on the mobile device 602 and the second UI 611 is presented on the alternative playback device 610. The mobile device 602 and the alternative playback device 610 may be in communication via a network 105, as described in conjunction with FIG. 1.

The mobile device 602 may include a display to present a UI 605 that includes content 604, as described herein. The content 604 may be any content (e.g., search results, social media, web page) that includes media items. The mobile device 602 may also present a voice search button 624 in a first portion of the UI 605 and the content 604. The voice search button 624 may be an interface tool that receives input from a user (e.g. by tabbing the voice search button 624) to initiate a voice search using the mobile device. The content 604 may also include search tip 606 indicating to a user that a voice search capability may be performed via the voice search button. The content 604 may further include a notification message 607 indicating to a user that the mobile device is ready to cast to TV when a casting session has been initiated via casting session button 625.

A user of the mobile device 602 may initiate a casting session with the alternative playback device 610 via casting session button 625. For example, mobile device 602 may receive the casting session initiation request from the user in the form of a gesture. The user may touch an area of the display of the mobile device 602 represented by the area of the casting session button 625. Upon receiving the request to initiate a casting session, the mobile device 602 may send a casting session request to the alternative playback device 610 via network 105. In some implementations, upon successful initiation of the casting session between the mobile device 602 and the alternative playback device 610 the mobile device may display a notification message 607 that the mobile device 602 is ready to cast to the alternative playback device 610 (e.g. TV). Further, the alternative playback device 610 may display a notification message 620 indicating to the user that the alternative playback device 610 is successfully linked to mobile device 602. When the casting session has been successfully initiated, the voice search function may be performed on the mobile device, as explained in more details herein above.

Figure 6:
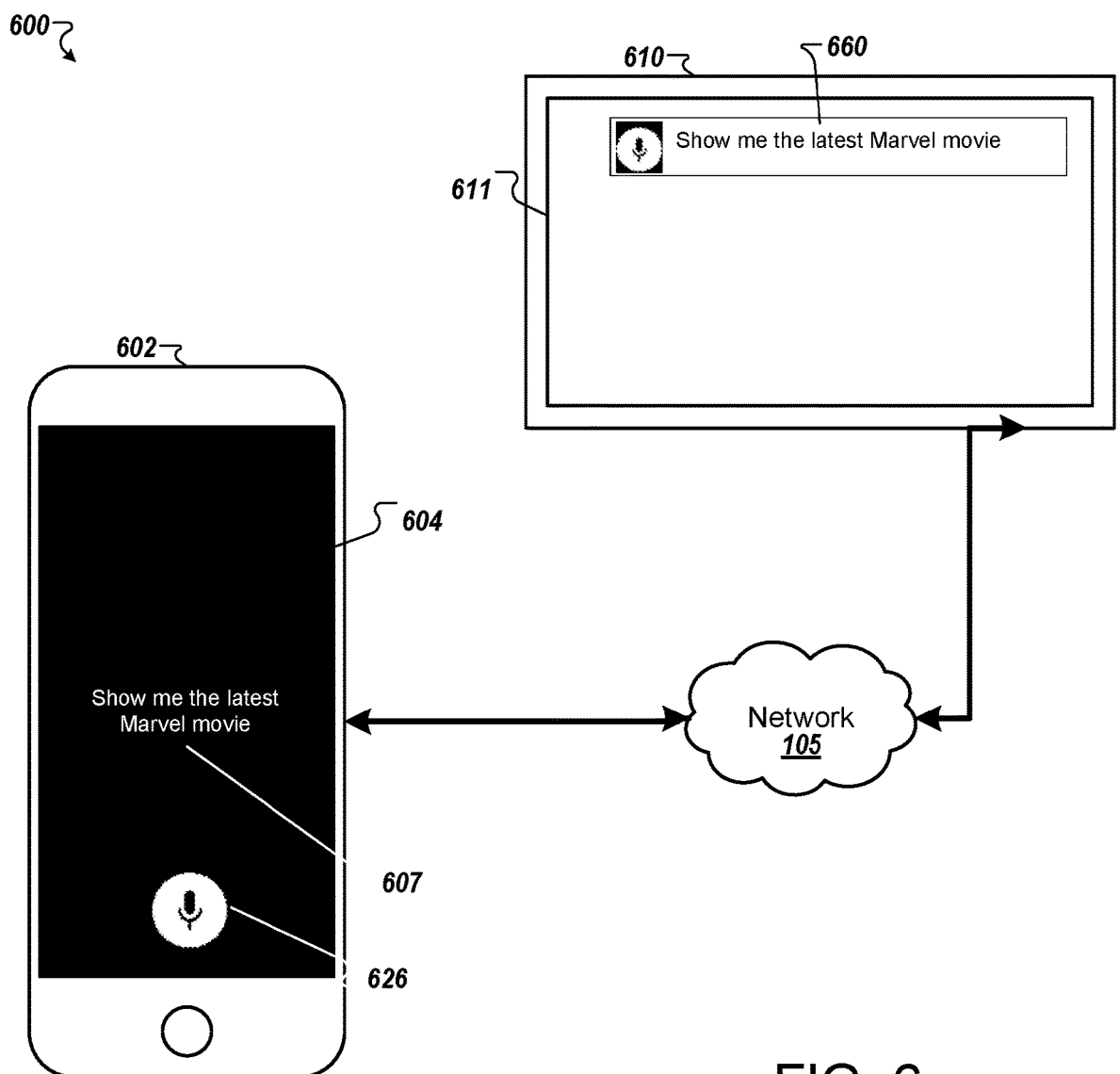
FIG. 6 is an example system that includes a mobile device with a first GUI to record an audio input from a user and to send a derived textual search query to an alternative playback device, in accordance with some embodiments of the disclosure.

FIG. 6 is an example system 600 that includes a mobile device 602 with a first GUI 605 to record an audio input from a user and to send a derived textual search query to an alternative playback device 610, in accordance with some embodiments of the disclosure. After a user selects a voice search GUI element (e.g. by tabbing the voice search button 624 of FIG. 5) The content 604 may be modified to display a voice search icon 626, indicating that the microphone of the mobile device 602 is active and may be recording audio input from the user. The user may speak a phrase representing search criteria for one or more media items. In some implementations, when the user speaks the search phrase, the mobile device 602 may display in a notification message 607 a textual search query derived from the spoken search phrase. For example, a user may say "Show me the latest Marvel movie", which may be displayed in the notification message 607 of the mobile device 602 after a brief processing time from receiving the phrase by the microphone of the mobile device 602.

The mobile device 602 may then submit the textual search query to the alternative playback device 610 via the casting session over network 105, as explained in more details herein above. In some implementations, to enable the user to match search results with search criteria, the textual search query may also be displayed in a notification message portion 660 of a second GUI 611 of the alternative playback device 610. For example, the notification message 660 may read "Show me the latest Marvel movie", representing the textual search query received from the mobile device 602.

Figure 7:
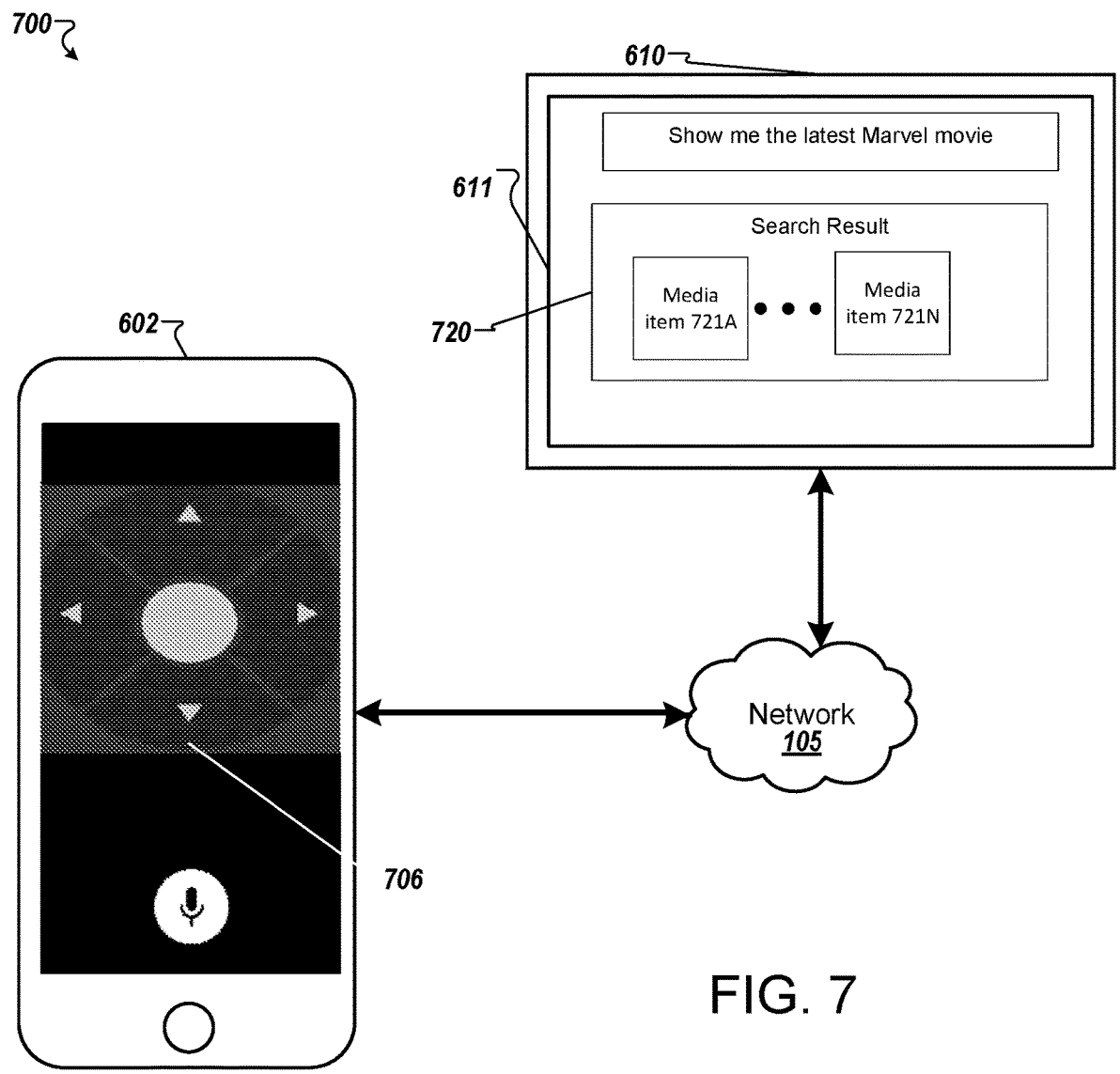
FIG. 7 is an example system that includes a mobile device with a first GUI to navigate media items in search result displayed on a second GUI on a screen of an alternative playback device, in accordance with some embodiments of the disclosure.

FIG. 7 is an example system 700 that includes a mobile device 602 with a first GUI 605 to navigate media items in search result displayed on a second GUI 611 on a screen of an alternative playback device 610, in accordance with some embodiments of the disclosure. The alternative playback device 610 may receive a textual search query from the mobile device 602 via the casting session and may initiate the search by submitting the textual search query to a content sharing platform to perform the search. The content sharing platform may perform the search and may then transmit search result 720 to the alternative playback device 610 to be presented to the user on the second GUI 611. In one example, the search results may be presented on the second GUI 611 of an application (e.g. a television application) associated with the content sharing platform. The search result 720 may consist of media items 721A-N comprising media items that match the search criteria specified by the user in the textual search query. A media item 721 in this context may represent any media item that may be played on an application hosted by an alternative playback device (e.g. television application). Examples of a media item 721 may include, and are not limited to, digital video, digital movies, animated images, digital photos, digital music, digital audio, etc. the user may select one of the media items 721A-N to be played on the second GUI 611 of the alternative playback device 610.

While the second GUI 611 on the alternative playback device 610 is displaying the search result 720, the first GUI 605 on the mobile device 602 may display a navigation GUI element 706, to navigate media items 721A-N within the search result 720 displayed on the second GUI 611. In some implementations, the navigation GUI element 706 may represent a virtual directional pad that includes keys corresponding to up, down, left, right (e.g. as represented by the up, down, left, and right arrows of the navigation GUI element 706). The navigation GUI element 706 may receive key input selections when the user presses one or more of the virtual keys on the directional pad. The mobile device 602 may then transmit the key inputs to the alternative playback device 610 for processing. As the user tabs the arrows of the navigation GUI 706, a focus on one media item 721A-N of the search results 720 may move in the direction of the tabbed arrow, such that one media item 721A-N may be selected at a given time. The navigation GUI element 706 may further include a select button (e.g. the center circular button of the navigation GUI element 706) to select the media item 721A-N that currently has the focus. When the user tabs the select button, the media item that currently has the focus may play in the second GUI 611 of the alternative playback device 610. The first GUI 605 of the mobile device 602 may then be changed to display the voice search element 624 and the original content area 604 depicted in FIG. 5.

Figure 8:
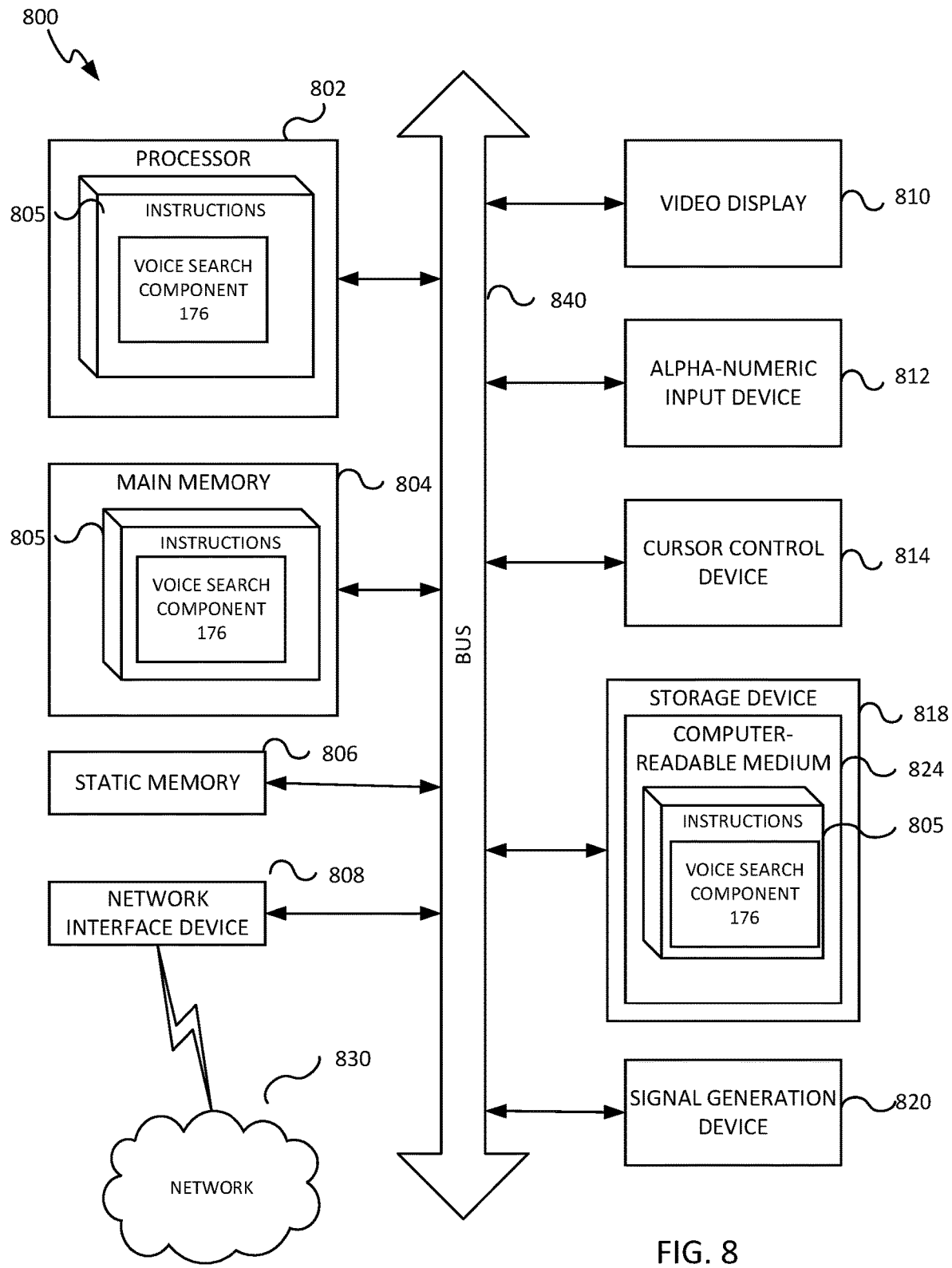
FIG. 8 illustrates an example block diagram of a computing device operating in accordance with one or more implementations of the present disclosure.

FIG. 8 illustrates an example block diagram of a computing device operating in accordance with one or more implementations of the present disclosure. The computer system 800 can be server 106 or client device 110 and 170 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 (e.g., of communication application 112) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 820 (e.g., a speaker).

The data storage device 818 can include a non-transitory machine-readable storage medium 824 (also computer-readable storage medium) on which is stored one or more sets of instructions 805 (e.g., of communication application 112) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 830 via the network interface device 808.

In one implementation, the instructions 805 include instructions for voice search component 176 (e.g., voice search component 117 in FIG. 1) and/or a software library containing methods that call the voice search component 117. In some implementations, the instructions 805 include instructions for the voice search component 117, the user interface 114, the content viewer 116, and/or the communication application 112. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
  responsive to initiating a mobile application on a mobile device, detecting a message broadcasted by an alternative playback device and initiating a casting session with the mobile device, the message reflecting a user request to perform a voice search on the mobile device;
  causing presentation of a graphical user interface (GUI), associated with the mobile application, on a screen of the mobile device of a user, the GUI including a voice search GUI element representing a voice search;
  receiving a user selection of the voice search GUI element;
  receiving an audio input of the user to request a search of one or more media items, the audio input specifying one or more search criteria for the search; and
  causing, via the casting session, presentation of a textual search query derived from the audio input and of a result of the search on a screen of the alternative playback device by submitting, via the casting session, the textual search query for processing.

2. The method of claim 1, wherein the result of the search is not presented to the user on the screen of the mobile device.

3. The method of claim 1, wherein detecting the casting session between the mobile device and the alternative playback device further comprises:
  receiving, via the GUI, a user request to initiate the casting session between the mobile device and the alternative playback device.

4. The method of claim 1, wherein submitting the textual search query for processing further comprises:
  submitting the textual search query to at least one of the alternative playback device or a backend server for processing.

5. The method of claim 1, wherein the result of the search is presented on the screen of the alternative playback device.

6. The method of claim 1, wherein the alternative playback device is a television system.

7. The method of claim 1, further comprising:
  responsive to submitting the textual search query, displaying, on the screen of the mobile device, a navigation GUI element to navigate the result of the search on the screen of the alternative playback device.

8. The method of claim 1, further comprising:
  displaying, on the GUI, a voice search tip to prompt the user to provide the audio input; and
  activating an audio input receiving feature of the mobile device to receive the audio input from the user.

9. The method of claim 1, further comprising:
  responsive to failing to receive the audio input of the user to request the search:
    deactivating an audio input receiving feature of the mobile device; and
    responsive to receiving the selection of the voice search GUI element, activating the audio input receiving feature of the mobile device to receive the audio input from the user.

10. The method of claim 1, wherein the result of the search query is selected by a content sharing platform based on a device type of the alternative playback device, and wherein the result of the search query is transmitted, by the content sharing platform, to the alternative playback device for display.

11. A system comprising:
  a memory; and
  a processing device, coupled to the memory, to perform operations comprising:
    responsive to initiating a mobile application on a mobile device, detecting a message broadcasted by an alternative playback device and initiating a casting session with the mobile device, the message reflecting a user request to perform a voice search on the mobile device;
    causing presentation of a graphical user interface (GUI), associated with the mobile application, on a screen of the mobile device of a user, the GUI including a voice search GUI element representing a voice search;
    receiving a user selection of the voice search GUI element;
    receiving an audio input of the user to request a search of one or more media items, the audio input specifying one or more search criteria for the search; and
    causing, via the casting session, presentation of a textual search query derived from the audio input and of a result of the search on a screen of the alternative playback device by submitting, via the casting session, the textual search query for processing.

12. A non-transitory computer-readable medium to store instructions, which when executed by one or more processing devices, cause the one or more processing devices to perform operations comprising:
  responsive to initiating a mobile application on a mobile device, detecting a message broadcasted by an alternative playback device and initiating a casting session with the mobile device, the message reflecting a user request to perform a voice search on the mobile device;
  causing presentation of a graphical user interface (GUI), associated with the mobile application, on a screen of the mobile device of a user, the GUI including a voice search GUI element representing a voice search;
  receiving a user selection of the voice search GUI element;

receiving an audio input of the user to request a search of one or more media items, the audio input specifying one or more search criteria for the search; and causing, via the casting session, presentation of a textual search query derived from the audio input and of a result of the search on a screen of the alternative playback device by submitting, via the casting session, the textual search query derived from the audio input for processing.

13. A non-transitory computer-readable medium to store instructions, which when executed by one or more processing devices, cause the one or more processing devices to:

responsive to initiating a mobile application on a mobile device, detect a message broadcasted by an alternative playback device and initiate a casting session with the mobile device, the message reflecting a user request to perform a voice search on the mobile device;

present a voice search graphical user interface (GUI) element on a GUI presented on a screen of the mobile device, the voice search GUI element representing the voice search;

responsive to receiving confirmation to perform the voice search, prompt the user to provide an audio input;

receive the audio input of the user to request a search of one or more media items, the audio input specifying one or more search criteria for the search; and cause, via the casting session, presentation of a textual search query derived from the audio input and of a result of the search on a screen of the alternative playback device by submitting, via a casting session, the textual search query for processing.

14. The computer-readable medium of claim 13, wherein to prompt the user to provide an audio input, the one or more processing devices are further to:

display, on the GUI, a voice search tip to prompt the user to provide the audio input; and responsive to an activation of the voice search GUI element, enabling the mobile device to receive the audio input from the user.

15. The computer-readable medium of claim 13, wherein to present a voice search GUI element on the screen of the mobile device, the one or more processing devices are further to:

initiate the casting session between the mobile device and the alternative playback device.

16. The computer-readable medium of claim 13, wherein the result of the search is not presented to the user on the screen of the mobile device.

17. The computer-readable medium of claim 13, wherein the alternative playback device is a television system.

18. The computer-readable medium of claim 13, wherein the one or more processing devices are further to:

responsive to submitting the textual search query, display, on the screen of the mobile device, a navigation GUI element to navigate the result of the search on the screen of the alternative playback device.

* * * * *